(12) United States Patent
Sandhu

(10) Patent No.: US 8,255,180 B2
(45) Date of Patent: Aug. 28, 2012

(54) ACOUSTOGRAPHY DYNAMIC RANGE EXTENDING DEVICE AND METHOD

(75) Inventor: Jaswinder Sandhu, Buffalo Grove, IL (US)

(73) Assignee: Santec Systems Inc., Arlington Heights, IL (US)

( * ) Notice: Subject to any disclaimer, the term of this patent is extended or adjusted under 35 U.S.C. 154(b) by 317 days.

(21) Appl. No.: 12/462,902

(22) Filed: Aug. 11, 2009

(65) Prior Publication Data

US 2011/0040511 A1 Feb. 17, 2011

(51) Int. Cl.
*G01D 18/00* (2006.01)
*G01D 21/00* (2006.01)
*G06F 19/00* (2011.01)
*G01N 29/04* (2006.01)
*G03H 3/00* (2006.01)
*G03H 1/00* (2006.01)

(52) U.S. Cl. ............ 702/85; 702/103; 702/104; 73/603; 359/1

(58) Field of Classification Search .................. 702/85, 702/103, 104; 73/603; 359/1
See application file for complete search history.

(56) References Cited

U.S. PATENT DOCUMENTS

| 5,447,509 A | * | 9/1995 | Mills et al. ................. 606/1 |
| 6,049,411 A | | 4/2000 | Sandhu et al. |
| 2006/0173385 A1 | * | 8/2006 | Lidgren et al. ............... 601/2 |
| 2008/0054091 A1 | * | 3/2008 | Babaev .................. 239/102.2 |

OTHER PUBLICATIONS

Roth et al., "Approaches for Non-Uniformity Correction and Dynamic Range Extension for Acoustography." Proceedings of SPIE, Bellingham, Washington, SPIE 2005, pp. 124-134.*
Roth, Mandlik & Sandhu, "Approaches for Non-Uniformity Correction and Dynamic Range Extension and Acoustography," *Proceedings of SPIE: Advanced Sensor Technologies for Nondestructive Evaluation and Structural Health Monitoring*, Bellingham, Washington, SPIE. 2005, pp. 124-134.

* cited by examiner

*Primary Examiner* — Janet Suglo
(74) *Attorney, Agent, or Firm* — JMLS Patent Clinic

(57) ABSTRACT

The acoustographic dynamic range extending device and method determines thresholds to reach a preset brightness with a test part and without a test part and transforms these thresholds to image data, where the thresholds can be time thresholds obtained with a single driving voltage and can be voltage thresholds obtained with an increasing driving voltage.

4 Claims, 1 Drawing Sheet

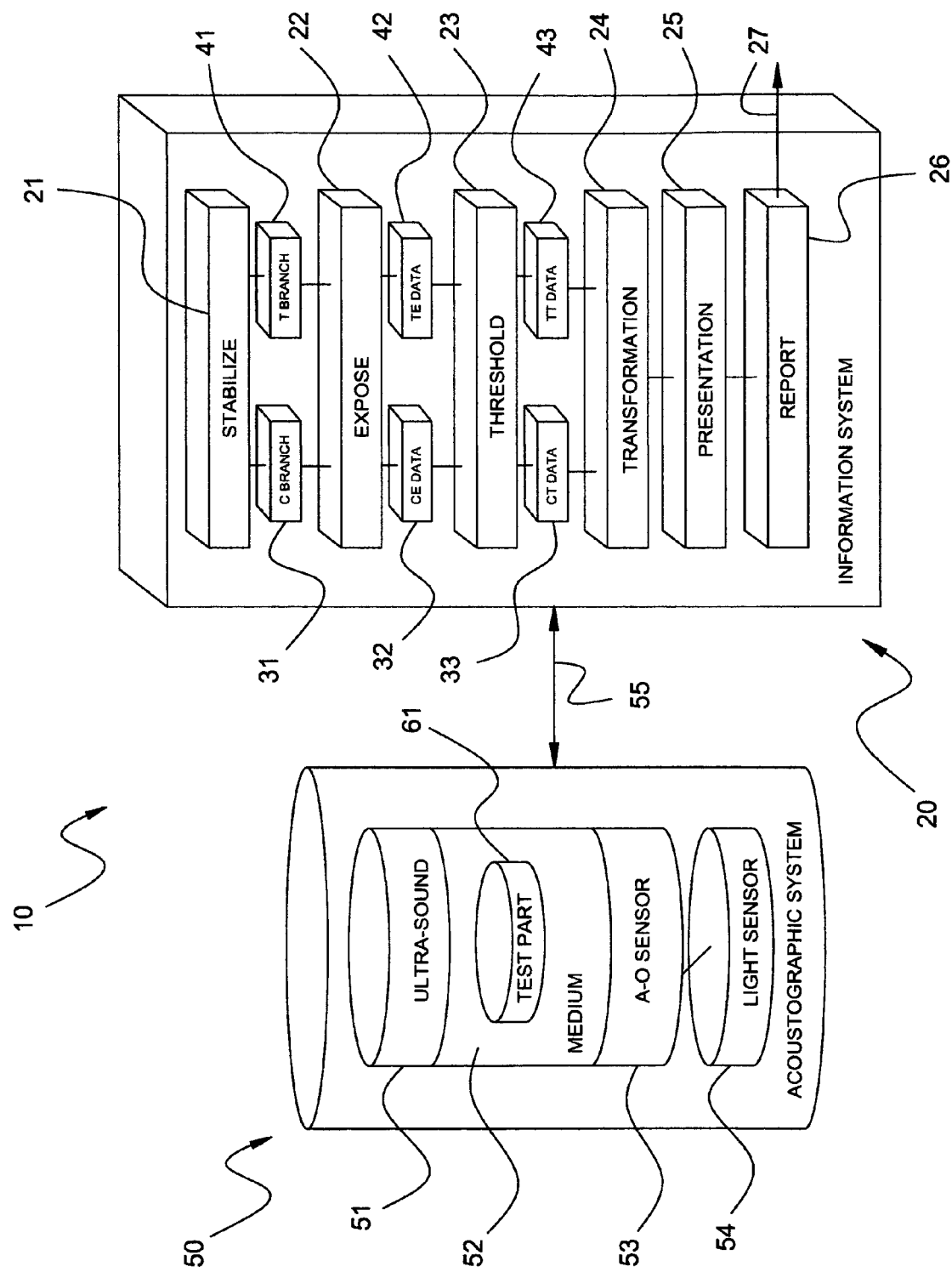

ACOUSTOGRAPHY DYNAMIC RANGE EXTENDING DEVICE AND METHOD

BACKGROUND OF THE INVENTION

Unexpected discovery of a transformation which avoids long-troubling distortions to make possible the long-sought goal of extending the dynamic range of acoustography to produce useful images reliably.

Acoustography is described in U.S. Pat. No. 6,049,411 which is incorporated herein by reference.

Previously the ultra-sound intensity needed to image a highly attenuating region of a test part causes distortions in imaging of low attenuating regions of the test part. Distortions occur because the ultra-sound intensity needed to image a highly attenuating region is sufficient to cause oscillations in the acousto-optic sensor response for a low attenuating region.

The long-troubling distortions, the long-sought dynamic range extending goal, and the state of the art for resolving the distortion problem and achieving the goal are described in detail in the publications: Roth, D. J., A. Mandlik, and J. Sandhu, "Approaches for Non-Uniformity Correction and Dynamic Range Extension for Acoustography." *Proceedings of SPIE: Advanced Sensor Technologies for nondestructive Evaluation and Structural Health Monitoring*, Bellingham, Wash., SPIE. 2005, pp 124-134 and Roth, D. J., R. A. Martin, L. Hertert, D. T. Chelmins, A. Mandlik, L. A. Cosgriff, and J. Sandhu, "Quantitative Ultrasonic Imaging Using Liquid Crystal Display Technology for Ceramic and Other Composites," *Materials Evaluation*, January, 2006, pp 61-65.

In these publications it was expected that a test part with an extended range of attenuating portions—for example, because the test part varies in thickness—could not be imaged using a single driving voltage driving the ultra-sound source. And, it was expected that the test part with an extended range of attenuating portions could not be imaged by an increasing driving voltage without waiting for the acousto-optic to reach equilibrium after each increase in voltage.

Both expectations are overcome by discovery that thresholds to reach a preset brightness—using a single driving voltage and alternatively an increasing driving voltage without waiting for the acousto-optic sensor to reach equilibrium after each increase in driving voltage—can be transformed to image data having the long sought extended dynamic range without having the long-troubling distortions.

In the drawing:

The acoustography dynamic range extending device is represented by 10. The acoustographic system is represented by 50, and 20 represents the information system connected 55 with the acoustographic system.

In the acoustographic system an ultra-sound source is 51. The ultra-sound source is driven by a sinusoidal driving voltage. References here to the driving voltage are to peak-to-peak values. A medium 52 couples the ultra-sound source to an acousto-optic sensor 53. A light sensor 54 views the acousto-optic sensor.

In the information system an optional stabilize component is represented by 21. This can stabilize the acousto-optic sensor after the mechanical shock caused when the ultra-sound source is activated and before exposure data are captured. This can be done by components of the instructions causing the information system to turn on an electric field across the acousto-optic sensor before activating the ultra-sound source. Alternatively the power to the ultra-sound source can be increased slowly.

That there is a calibration set of measurements yielding calibration exposure data, with no test object between the ultra-sound source and the acousto-optic sensor, and a test set of measurements yielding test exposure data, with a test object 61 between the ultra-sound source and the acousto-optic sensor, is indicated by 31 and 41. An optional expose component is represented by 22 with calibration exposure data represented by 32 and the test exposure data represented by 42.

A threshold component is represented by 23 with the recorded calibration thresholds data represented by 33 and the recorded test thresholds data represented by 43.

A transformation component for transforming thresholds data to image data is represented by 24.

A report component for outputting 27 image data is represented by 26. An optional presentation component is represented by 25. The presentation component can transform image data to presentation forms known in data presentation art.

The acoustography dynamic range extending device which avoids long-troubling distortions to extend the dynamic range of acoustography comprises an acoustographic system having a light sensor for viewing, and capturing exposures of, an acousto-optic sensor while ultra-sound is incident on the acousto-optic sensor; and comprises dynamic range extending instructions encoded in an information bearing medium readable by an information system.

Best sensitivity is obtained by viewing the acousto-optic sensor at an optimum angle as described in U.S. Pat. No. 6,049,411.

The dynamic range extending instructions have components comprising a threshold component, a transformation component, and a report component.

The threshold component is for causing the information system to determine, thresholds to reach a preset brightness for each light sensor pixel in recorded exposure data recorded in the information system.

Recorded exposure data comprise calibration exposure data captured by the light sensor while no test part is between the ultra-sound source and the acousto-optic sensor and comprise test exposure data captured by the light sensor while a test part is between the ultra-sound source and the acousto-optic sensor.

As many as 5,000, and more, exposures can be captured for the calibration exposure data and also for the test calibration data. With 5,000 exposures and with N by M light sensor pixels the calibration exposure data and the test exposure data would each have 5,000 times N times M components.

The instructions can have an optional expose component for causing the information system to cause the acoustographic system to capture the exposure data and to input the exposure data to be recorded in the information system.

The threshold component is also for causing the information system to record thresholds as threshold data, where threshold data comprise calibration pixel thresholds—$t_c$—for each light sensor pixel in the calibration data and test pixel thresholds—$t_p$—for each light sensor pixel in the test data.

Calibration pixel thresholds can be historical values used with several sets of test exposure data.

When a single driving voltage drives the ultra-sound source, then:

test thresholds ($t_p$) are test times to reach the preset brightness in each imager pixel with a part between the ultrasound source and the acousto-optic sensor, and calibration thresholds ($t_c$) are calibration times to reach the preset brightness in each imager pixel with no part between the ultrasound source and the acousto-optic sensor.

When an increasing driving voltage drives the ultra-sound source, then:

test thresholds ($t_p$) are test driving voltages needed to reach the preset brightness in each imager pixel with a part between the ultrasound source and the acousto-optic sensor, and calibration thresholds ($t_c$) are calibration driving voltages needed to reach the preset brightness in each imager pixel with no part between the ultrasound source and the acousto-optic sensor.

In both cases the preset brightness is a brightness below the oscillating region of the acousto-optic brightness response for least attenuation. In both cases some highly attenuating portions of the test part man not reach the preset brightness at the highest time in the single voltage case and at the highest voltage in the increasing voltage case.

The transformation component is for causing the information system to transform thresholds data to image (I) data for each light sensor pixel using the transformation $I=f(t_p/t_c)$, where the function f is determined by historical data for the specific acoustographic system.

The function $I=C \log(t_p/t_c)$, where C is determined by historical data for the specific acoustographic system, can be used. This and other functions must be evaluated for each specific acoustographic system.

The output component is for causing the information to cause output of image data.

The information system can be a general purpose device and can be a special purpose device. The information system can be a component of the acoustographic system, can be stand alone, and can be accessed via a network.

The acoustography dynamic range extending method which avoids long-troubling distortions to extend the dynamic range of acoustography comprises determining from recorded exposure data thresholds to reach a preset brightness, recording thresholds as threshold data, transforming threshold data to image data, and outputting image data.

Recorded exposure data are captured by, and recorded from, an acoustographic system having a light sensor for viewing, and capturing exposures of, an acousto-optic sensor while ultra-sound is incident on the acousto-optic sensor.

Recorded exposure data comprise calibration exposure data captured by the light sensor while no test part is between the ultra-sound source and the acousto-optic sensor and comprises test exposure data captured by the light sensor while a test part is between the ultra-sound source and the acousto-optic sensor.

The step of recording thresholds comprises recording thresholds as recorded threshold data, where recorded threshold data comprise calibration pixel thresholds—$t_c$—for each light sensor pixel in the calibration data and comprise test pixel thresholds—$t_p$—for each light sensor pixel in the test data.

When a single driving voltage drives the ultra-sound source, then:

test thresholds ($t_p$) are test times to reach the preset brightness in each imager pixel with a part between the ultrasound source and the acousto-optic sensor, and calibration thresholds ($t_c$) are calibration times to reach the preset brightness in each imager pixel with no part between the ultrasound source and the acousto-optic sensor.

When an increasing driving voltage drives the ultra-sound source, then:

test thresholds ($t_p$) are test driving voltages needed to reach the preset brightness in each imager pixel with a part between the ultrasound source and the acousto-optic sensor, and calibration thresholds ($t_c$) are calibration driving voltages needed to reach the preset brightness in each imager pixel with no part between the ultrasound source and the acousto-optic sensor.

The step of transforming recorded thresholds data to image data comprises transforming recorded thresholds data to image (I) data for each light sensor pixel using the transformation $I=f(t_p/t_c)$.

The function $I=C \log(t_p/t_c)$, where C is determined by historical data for the specific acoustographic system, can be used. This and other functions must be evaluated for each specific acoustographic system.

Steps of the method can be caused by dynamic range extending instructions causing the information system to cause the steps. The information system can be a general purpose device and can be a special purpose device. This information system can be a component of the acoustographic system, can be stand alone, and can be accessed via a network.

The invention claimed is:

1. An acoustography dynamic range extending device which avoids long-troubling distortions to extend the dynamic range of acoustography, the device comprising:
A) an acoustographic system having a light sensor for viewing, and capturing exposures of, an acousto-optic sensor while ultra-sound is incident on the acousto-optic sensor; and
B) dynamic range extending instructions encoded in an information bearing medium readable by an information system, the dynamic range extending instructions having components comprising:
   i) a threshold component for causing the information system to determine thresholds to reach a preset brightness for each light sensor pixel in recorded exposure data recorded in the information system,
      a) where recorded exposure data comprise calibration exposure data captured by the light sensor while no test part is between the ultra-sound source and the acousto-optic sensor and comprise test exposure data captured by the light sensor while a test part is between the ultra-sound source and the acousto-optic sensor,
         1) the threshold component being also for causing the information system to record thresholds as threshold data, where threshold data comprise calibration pixel thresholds—$t_c$—for each light sensor pixel in the calibration data and test pixel thresholds—$t_p$—for each light sensor pixel in the test data;
            A) where, when an increasing driving voltage drives the ultra-sound source, then:
               i) test thresholds ($t_p$) are test driving voltages needed to reach the preset brightness in each light sensor pixel with a part between the ultra-sound source and the acousto-optic sensor, and
               ii) calibration thresholds ($t_c$) are calibration driving voltages needed to reach the preset brightness in each light sensor pixel with no part between the ultrasound source and the acousto-optic sensor,
   ii) a transformation component for causing the information system to transform thresholds data to image data (I) by a transformation $I=f(t_p/t_c)$ applied to the thresholds data for each light sensor pixel where the function is determined from historical data for the acoustographic system; and
   iii) a report component for causing the information system to output image data.

2. The device of claim 1 where calibration thresholds data are historical calibration thresholds data which can be used along with several sets of test thresholds data.

3. The device of claim 1 where the transformation is $I=C \log(t_p/t_c)$, where C is determined from historical data for the acoustographic system.

4. An acoustography dynamic range extending method which avoids long-troubling distortions to extend the dynamic range of acoustography, the method comprising:
   A) determining from recorded exposure data thresholds to reach a preset brightness threshold for each light sensor pixel in the exposure data;
      i) where recorded exposure data are captured by, and recorded from, an acoustographic system having a light sensor for viewing, and capturing exposures of, an acousto-optic sensor while ultra-sound is incident on the acousto-optic sensor,
      ii) where recorded exposure data comprise calibration exposure data captured by the light sensor while no test part is between the ultra-sound source and the acousto-optic sensor and comprise test exposure data captured by the light sensor while a test part is between the ultra-sound source and the acousto-optic sensor,
   B) recording thresholds as recorded threshold data, where recorded threshold data comprise calibration pixel thresholds—$t_c$—for each light sensor pixel in the calibration data and comprise test pixel thresholds—$t_p$—for each light sensor pixel in the test data;
      i) where, when an increasing driving voltage drives the ultra-sound source, then:
         a) test thresholds ($t_p$) are test driving voltages needed to reach the preset brightness in each light sensor pixel with a part between the ultrasound source and the acousto-optic sensor, and
         b) calibration thresholds ($t_c$) are calibration driving voltages needed to reach the preset brightness in each light sensor pixel with no part between the ultrasound source and the acousto-optic sensor,
   C) transforming recorded thresholds data to image (I) data for each light sensor pixel using the transformation $I=f(t_p/t_c)$ applied to the thresholds data for each light sensor pixel where the function f is determined from historical data for the acoustographic system; and
   D) outputting image data.

\* \* \* \* \*